Feb. 12, 1957 A. C. STOCKER 2,781,445
CIRCUIT FOR CONTINUOUSLY CORRECTED STORAGE
Filed May 20, 1953 2 Sheets-Sheet 1

INVENTOR.
ARTHUR C. STOCKER
BY *Milton S. Winters*
ATTORNEY

Feb. 12, 1957 A. C. STOCKER 2,781,445
CIRCUIT FOR CONTINUOUSLY CORRECTED STORAGE
Filed May 20, 1953 2 Sheets-Sheet 2
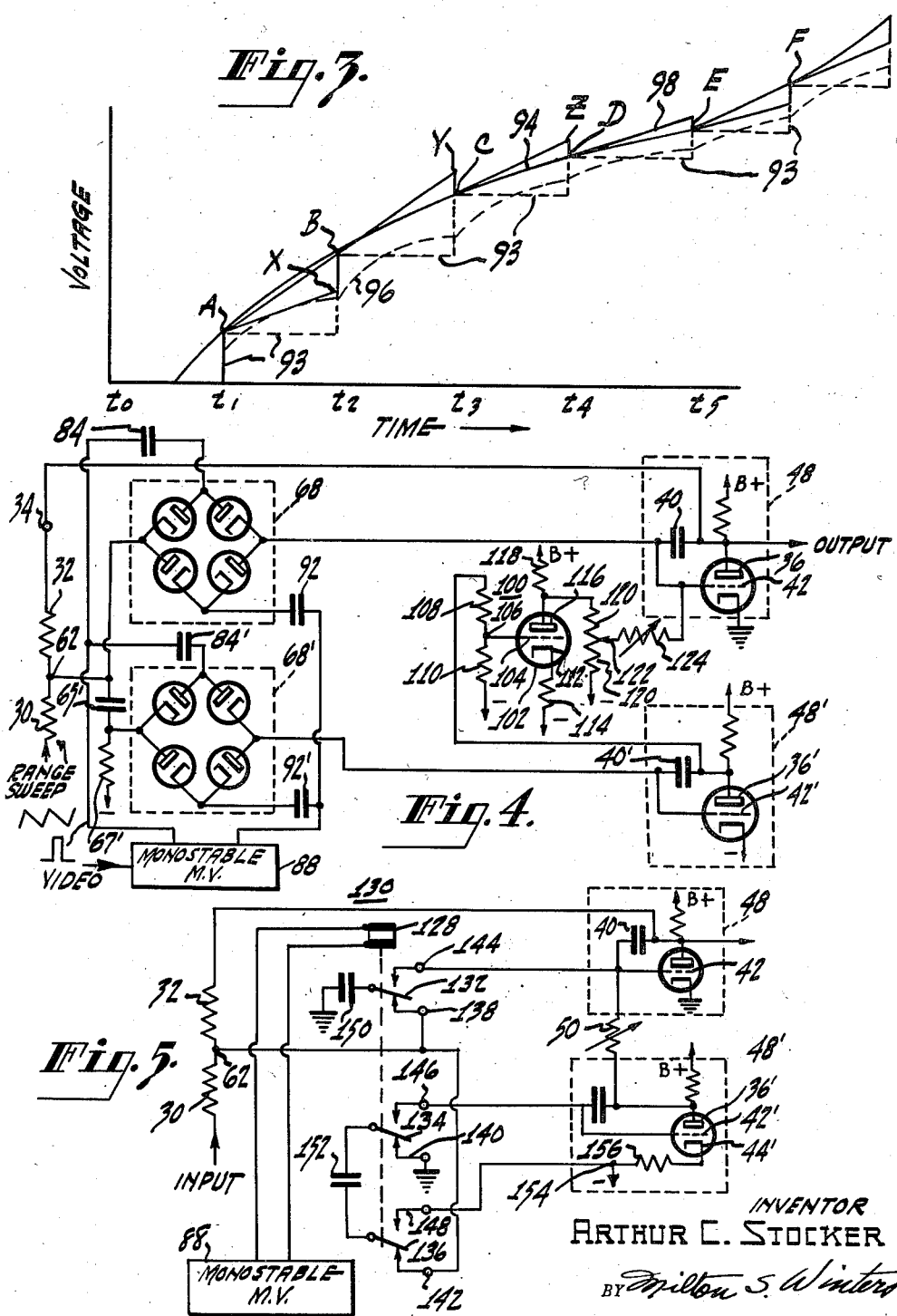
INVENTOR
ARTHUR C. STOCKER
BY Milton S. Winters
ATTORNEY

United States Patent Office 2,781,445
Patented Feb. 12, 1957

2,781,445

CIRCUIT FOR CONTINUOUSLY CORRECTED STORAGE

Arthur C. Stocker, Collingswood, N. J., assignor to Radio Corporation of America, a corporation of Delaware Application May 20, 1953, Serial No. 356,283

20 Claims. (Cl. 250—27)

The present invention is related to electrical signal storage circuits, and particularly to a rate corrected storage circuit.

Various types of storage circuits are known and are used in many different circuits. One type of circuit which is especially useful is the Miller storage circuit. This circuit employs a capacitor connected between the anode and control element of an amplifying device, for example, a vacuum tube. The control element is connected to a difference circuit which applies to the control element the difference between the voltage to be stored and the anode voltage. When the voltage at the difference circuit is increased in one sense, say positively, thus transferring charge to the capacitor by an amount proportional to the error, or difference, the amplifying element increases current through the anode load. The anode voltage decreases, tending to decrease the control element charge by feedback through the capacitor. The difference voltage is also thus reduced. A converse action takes place if the difference voltage is increased in the opposite sense. The anode voltage is thus quickly brought to the applied voltage, as the difference voltage is reduced to zero. If the difference voltage is disconnected, the charge on the control element cannot change, and the anode voltage then remains for a substantial period of time at the level of the formerly applied input signal voltage. Whether the applied input voltage is greater than, less than, or equal to the previous anode voltage, the anode voltage quickly assumes the new value, and such value is stored for a substantial period of time after disconnection of the difference voltage.

From a different viewpoint, the anode voltage may be considered the integrated value of the difference between the input and the anode voltages. Then the difference is the rate of change of the anode voltage. Therefore, the anode voltage changes rapidly, and toward a condition of stability at which the grid voltage is near a fixed value. At this point, the anode voltage must correspond to and represent the input voltage. If the feedback of difference voltage to grid is open-circuited, the grid charge and the stored anode voltage remain with substantially no change for a comparatively long period of time.

The circuit is exceptionally well suited for storing intermittently applied voltages. However, its very excellence creates a problem, in that the anode voltage remains at its previous value, until the next input voltage is applied, when a substantially discrete or instantaneous voltage step to the new value occurs. This action, although desirable under some circumstances, is undesirable where the stored voltage is to be employed for tracking, or following the applied input voltage. The stored voltage does not anticipate or have any correction for the periods between application of the voltages to be stored.

It is an object of the present invention to provide a novel storage circuit.

Another object of the invention is to provide a stored voltage having a continuous correction substantially corresponding to rate correction.

A further object of the invention is to improve the operation of a Miller type storage circuit.

Another object of the invention is to improve the operation of a Miller type storage circuit particularly as employed for storing intermittent voltages, and to provide for continuous correction of the stored voltage in a manner closely corresponding to rate correction.

In accordance with the invention, first and second storage circuits are employed with the output of one connected to a difference circuit to derive a difference signal between the output and a signal from a source. This difference voltage is applied over two signal paths, one of which includes the second storage circuit, to the input of the first storage circuit. Further, the signal paths are connected and disconnected, the connection being made intermittently, preferably over equal intervals short (that is, less than about ten per cent) compared to the disconnect periods. The second storage circuit output is continuously applied to the first storage circuit input in a sense to provide rate correction in the disconnect periods by transfer of charge at rate proportional to the desired correction.

An important feature of the invention is the employment of Miller storage circuits, whereby a feed-through resistor from the second storage circuit to the first storage circuit input is selected to provide the appropriate linear correction over the periods between connection intervals.

As will be more fully apparent hereinafter, the first storage circuit output voltage assumes the value of the source signal during connection intervals. The second storage circuit output represents the last difference between the source signal and the first storage circuit output, and therefore represents, approximately, the slope or rate of change of the intermittently applied voltage. The second storage circuit output represents the slope of the chord line or linear rate of change between input and output between the last occurring intervals. Therefore, this second storage circuit output voltage is applied as a continuous correction to the first storage circuit input, in the proper sense, to act as a correction which is substantially a rate correction. Thus the first storage circuit input is changed, between intervals, in a manner to anticipate closely the incoming source voltages, if the intermittently sampled source voltage lies on a reasonably smooth curve.

The foregoing and other objects, advantages, and novel features of the invention will be more fully apparent from the following description, when read in connection with the accompanying drawing, in which like reference characters refer to similar parts, and in which:

Fig. 3 is a plot of voltages useful in understanding the invention and some of its advantageous features;

Fig. 4 is a circuit diagram schematically illustrating another embodiment of the invention in which the input voltages are applied in like polarity to the control elements of the two Miller storage circuits, but the voltage polarity is reversed in applying the anode voltage of the second storage circuit to the control element of the first storage circuit;

Fig. 5 is a circuit diagram schematically illustrating a different embodiment of the invention employing charge transferring capacitors and mechanical switches for application of the difference voltage in opposite polarity to the two Miller storage circuits.

Figure 1:
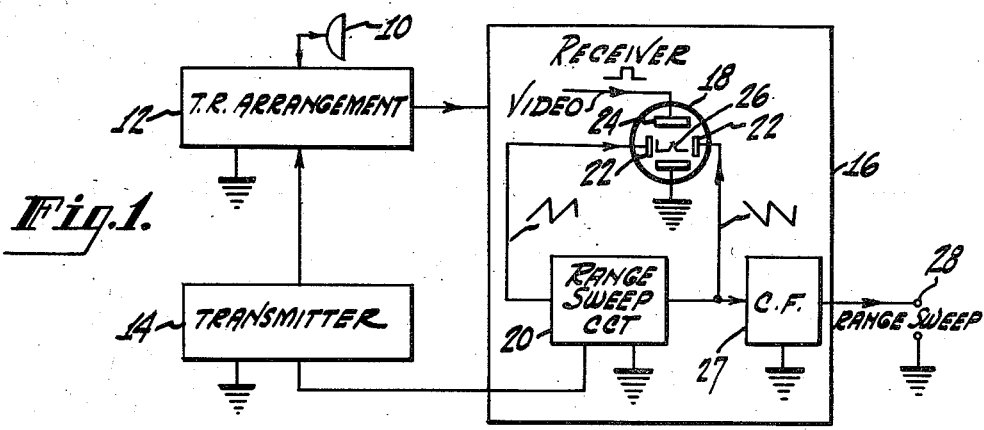
Fig. 1 is a block diagram schematically portraying a radar (radio echo detection and ranging) system in which the invention may be employed.

Referring to Fig. 1, a radar (radio echo detection and ranging) set includes a directional antenna 10 connected through a TR arrangement 12 during transmit periods to a pulsed carrier transmitter 14, and during non-transmit periods to a receiver 16. The receiver 16 may include a cathode ray tube indicator 18 for displaying received echo pulses. A range sweep circuit 20 is connected to the transmitter 14 to receive an impulse with the transmission of each pulse of carrier energy. Each impulse received at the range sweep circuit initiates a sweep voltage which deflects the cathode ray beam say from left to right as viewed by an observer, across the face of the indicator 18. The sweep voltage may be push-pull, as shown, and applied to the horizontal deflecting plates 22 of the indicator 18. The echo pulses, after demodulation and amplification, may be applied to a vertical deflecting plate 24 as a "video" pulse, as it is sometimes called. A common ground connection is conventionally illustrated.

The operation of the system of Fig. 1 is well understood. The sweep of the cathode ray from left to right may be linear with time. The distance of the pip 26 due to a video signal corresponding to a particular target, or echoing object, from the start of the sweep is proportional to the range or distance of the target from the antenna 10 and may be so calibrated.

In radar systems, it is often desired to secure a voltage proportional to the range of the target. This range voltage may be used for automatic range gating (disabling the receiver except for a short interval centered in time at the expected time of reception of the echo) in order to exclude extraneous noise or undesired target indications. The range voltage may be used to cause a separate indicator to follow or track a selected target in range automatically, or for gun control purposes. It is convenient to describe the invention as a circuit employed for obtaining such a range voltage. However, it will be understood that the circuit of the invention may be employed to advantage for other purposes in a radar system, or in other systems than radar systems, for storing and following or tracking intermittently available data in voltage form.

Figure 2:
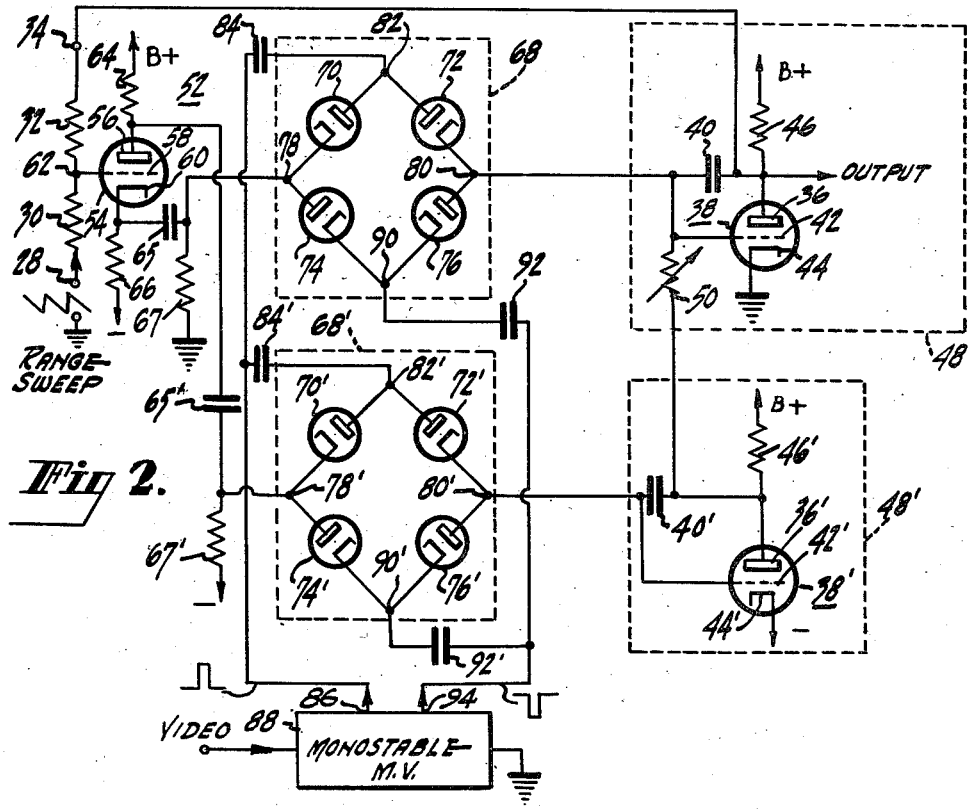
Fig. 2 is a circuit diagram schematically illustrating an embodiment of the invention in which the input voltages are applied to the control elements of the two Miller storage circuits in opposite polarity.

Referring to Fig. 2, the range sweep voltage may be applied from a cathode follower 27 of Fig. 1 to one terminal 28 of a pair of resistors 30, 32 (Fig. 2), series connected as a difference network. The other terminal 34 of resistors 30, 32 is connected to the anode 36 of a vacuum tube 38. A capacitor 40 is connected between the anode 36 and the control element or grid 42. The cathode 44 of tube 38 is connected to ground. Anode voltage is applied through an anode load resistor from a suitable source indicated as B+. The circuit 48 including the tube 38, load resistor 46, and capacitor 40 is a form of a Miller integrating circuit. The Miller integrating circuit commonly employs a pentode. Although only triodes are shown herein in the Miller circuits, the manner of connection for pentodes is readily understood, and usually preferred, for reasons understood in the art. See, for example, "Waveforms" by Chance et al., volume 19 of the Radiation Laboratory Series, pages 278–285, for a discussion of the Miller circuit. A second Miller circuit 48' is similar to that of the first Miller circuit 48, corresponding parts being indicated by like numerals bearing a prime.

A resistor 50 is connected between the anode 36' of the second Miller circuit and the grid 42 of the first. In the second Miller circuit 48', however, the cathode 44' is returned to a voltage negative with respect to ground, for a reason explained hereinafter.

An inverter stage 52 includes a vacuum tube 54 having an anode 56, control grid 58, and cathode 60. The inverter stage grid 58 is connected to the junction 62 between the serially connected resistors 30, 32. Inverter tube 54 has an anode resistor 64 and cathode resistor 66, preferably equal in value. A diode switch circuit 68, in itself known, is connected between the inverter tube cathode 60 and the first Miller circuit grid 42, by way of a D. C. blocking capacitor 65. The diode switch circuit 68 includes four diodes 70, 72, 74, 76. The cathode of diode 70 and the anode of diode 74 are connected to one bridge terminal 78 which is connected to the inverter cathode 60 through blocking capacitor 65. A D. C. return resistor 67 is provided at terminal 78. The cathode of diode 72 and anode of diode 76 are connected to the bridge terminal 80 conjugate to terminal 78. The anodes of diodes 70 and 72 are connected to another bridge terminal 82 and through a capacitor 84 to one terminal 86 of a monostable multivibrator 88. The cathodes of diodes 74 and 76 are connected to a bridge terminal 90 of the other conjugate pair of bridge terminals 82 and 90, and through a capacitor 92 to another terminal 94 of monostable multivibrator 88. The multivibrator terminals 86 and 94 have opposite polarity pulse outputs, for example by connection to different anodes of the multivibrator 88. A second switch circuit 68' and its connections to the multivibrator 88 are similar to bridge circuit 68 and connections of the latter to the multivibrator 88, similar components being indicated by similar numerals bearing a prime. The second switch circuit 68' is connected between the inverter anode 56 and the second Miller circuit grid 42', by connection of conjugate terminals 78' and 80' respectively to inverter anode 56 and second Miller circuit grid 42'.

For simplicity of explanation, reception from only a single target is considered. The time between inception of the sawtooth wave and reception of the target is proportional to the range, assuming that the sawtooth increases (or decreases) at a fixed rate. Therefore, the amplitude of the sawtooth at the instant of reception of the echo is directly proportional to the range. At the instant of reception of the video pulse or echo (equipment delays are neglected, and correction may be made for these in known manner), the video pulse is applied to the monostable multivibrator 88. The multivibrator then assumes its unstable condition briefly and reverts to its stable position, generating a pair of pulses, or a pulse in push-pull at its output terminals 86, 94.

The multivibrator pulse closes the normally open switch circuit 68. As understood in the art, when the pulses from multivibrator 88 are applied, all the diodes conduct. The conjugate bridge terminals 82 and 90 go respectively positive and negative during the multivibrator pulse period. The switch circuit tubes all become conductive. The other conjugate terminals 78 and 80 are then substantially short-circuited to each other. After (or before) the multivibrator 88 pulse, no conduction paths exist between conjugate terminals 78 and 80, and the switch 68 is in its normally open condition. Thus the voltage at inverter cathode 60 is connected for the duration of the multivibrator pulse to the first Miller circuit grid 42.

Suppose for the moment that resistor 50 through which the output of the second Miller circuit 48' to the input of the first Miller circuit 48 is open circuited. Also, let it be supposed that for the first time, at a time $t_0$, when connection is made by the switch 68, that the first Miller circuit grid 42 has zero applied charge, corresponding to zero range, and the anode 36 at some arbitrary voltage corresponding to zero range. If the switch 68 connection is made, and junction 62 is at ground potential, the Miller circuit 48 does not change condition, as its grid 42 has already zero charge. Now let the video pulse occur at some definite range. The switch 68 is briefly closed at a corresponding time in the range sweep cycle. At this time, say $t_1$, the sweep voltage has reached a corresponding voltage, in this case negative or below ground, because it is desired that the Miller circuit output voltage go more positive with increased range. At the moment the switch is closed, negative charge begins to flow into the first Miller circuit grid. The first Miller circuit anode voltage begins to go up. The rate of rise due to the feedback path from Miller circuit anode 36 to the difference network of resistor 30 and 32, is very rapid. The voltage at junction 62, the effective difference point, is instantaneously at the average voltage value between the two terminals 28 and 34 of the serially connected resistors 30, 32. As these voltages at terminals 28 and 34 are opposite in polarity, this is equivalent to taking the difference between their values of amplitude. Due to the feedback path, the first Miller circuit 48 quickly comes into equilibrium, the first Miller circuit anode 36 voltage comes to some voltage value corresponding to the definite range and charge ceases to flow into the grid. Therefore, the anode voltage at any time is directly proportional to the last input voltage at the time the switch 68 closed.

The action so far described is illustrated by the partially dotted curve 93 of Fig. 3. The output voltage at first Miller circuit anode 36 at time $t_0$ corresponds to zero range. At $t_1$, an echo pulse is received, and the output voltage jumps to A, at $t_2$, the output voltage jumps to B, etc. Points A, B, C and D correspond to the voltages reflecting the true range at times $t_0$ to $t_5$. However, a smoothed curve such as 94 through A, B, C, D represents the actual target range. Except momentarily at $t_1$, $t_2$, etc. the output voltage fails to represent true range. This action of the circuit of Fig. 2 without the second Miller circuit 48′, second switch 68′, and with the further omission, if desired, of inverter 52 corresponds to the prior known art.

The stepped voltage curve 93 is disadvantageous for several reasons. The input data may change so rapidly, especially under certain circumstances, that the output voltage is so far from accurate, in the periods between pulse receptions, as to be of little value. Also, the sudden changes in value may be disturbing to automatic equipment, such as servo systems or computers, to which it is applied. For example, computers may be shocked into objectionable transients by the steps.

If the output (or input) is smoothed by ordinary filters, a curve such as 96 (shown also in dotted lines) results. The objectionable steps are substantially eliminated, but now there is introduced a serious lag between input and output.

The effect of the components comprising inverter 52, second switch 68′ and the second Miller circuit 48′ is to cause the output voltage to anticipate to a substantial degree the expected output, so that large sudden changes in value of the output voltage are avoided, and the output voltage tracks the intermittent input more faithfully, as for example along the curve AXBYCZD in full line designated 98.

Referring again to Figure 2, let the parts be connected as shown. At the instant switch 68 connects cathode 60 to the first Miller grid circuit 42, switch 68′ connects the difference voltage by a second path including inverter anode 56 to the second Miller circuit grid 42′, and thence from the second Miller circuit to the first Miller circuit grid 42. Now the cathode 60 voltage changes are in phase with those of the junction 62, or difference between input and output voltage. The voltage at inverter anode 56 is (except for the D. C. component removed or blocked by capacitor 65′) the negative of this difference voltage. The negative difference voltage is applied to the second Miller circuit grid 42′. The anode voltage of the second Miller circuit therefore is a voltage corresponding to the difference between the voltage or source input (range) at the last switch interval (which voltage is the first Miller circuit anode voltage) and that of the present switch interval, and is employed as a correction factor. The feed-through resistor 50 allows a current to flow from the anode of the second Miller circuit to the grid of the first, thereby effecting a continuous change of charge on the latter. Moreover, the feed-through resistor 50 is large enough so that the change caused by the feed-through charge is substantially linear with time throughout the longest interval expected between adjacent switch periods at any consecutive times $t_1$ and $t_1+1$. This linearity is easily accomplished because of capacitors 40 and 40′ and their high effective capacity. Because the first Miller circuit grid 42, for proper correction, should have its negative charge increased for increasing successive values of intermittent input (range), the difference voltage between input and output should be applied in opposite polarity to the two Miller circuit grids 42 and 42′. This is the reason for the inverter tube. If the final output voltage at anode 36 is to decrease from some arbitrary value with increased range, the polarity of the sweep voltage through resistor 30 may be reversed.

Also, it is desired that for a difference voltage of ground (for example corresponding to a fiducial range) voltage at junction 62, the first Miller circuit grid 42 should also be at ground potential. By suitably selecting the negative voltage applied to the cathode 44′ of the second Miller circuit, and its B+ voltage, this may be accomplished. The voltage at the free terminal of the D. C. return resistor 67 indicated as negative, may also be employed which is not necessarily the same as the voltage indicated as minus at the second Miller circuit cathode 44′. In other words, the B+ voltages indicated are not necessarily equal, nor are the minus voltages indicated, but should be suitably selected, which selection will be apparent to those skilled in the art from the description herein, and depends on the tubes employed, and the relationship between voltage and range to be established at the final output.

The effect of the complete circuit of Fig. 2 will be apparent from the output voltage curve 98. Each time a video pulse is received, the output voltage assumes its proper value at A, B, C, etc. In the intermediate time, however, the output voltage now follows a straight line increasing (or decreasing) linearly at the same rate as the last difference. For example, from $t_0$ to $t_1$, the voltage remains at the zero range level. At $t_1$, when a signal is first received, the output voltage jumps to A. From $t_1$ to $t_2$, the output voltage follows the straight line AX, at the same slope as straight line $t_0$A. At $t_2$, the output voltage jumps to B. The rate of increase in the interval $t_2$ to $t_3$ is determined now by the chord AB. Therefore the output voltage follows the straight line BY, etc.

Viewed geometrically, the correction is equivalent to accepting the slope of the straight line chord of an interval, as from $t_2$ to $t_3$, as the slope of the curve throughout the next interval, as from $t_3$ to $t_4$. The output voltage therefore tracks more closely than the circuit without correction. The correction is due to the charge applied by the second Miller circuit 48′.

The voltage across the feed-through resistor 50 is the difference between the voltages at the first Miller circuit grid 42 and the second Miller circuit anode 36′. The voltage at the second Miller circuit anode 36′ is a function of rate. However, the first Miller circuit grid voltage varies over a very small range, sufficiently small especially where pentrode circuits are employed, thus the charge transferred to the first Miller circuit grid 42 in the periods between the intervals when the switch connections are made, is at a rate substantially proportional to the voltage across resistor 50, which is substantially proportional to the desired rate correction.

Referring to Fig. 4, the switches 68 and 68′ are connected to apply voltages from junction 62 without phase inversion respectively to the first and second Miller circuits 48 and 48′. The D. C. blocking capacitor 65 and resistor 67 may be omitted here, but capacitor 65′ and resistor 67′ are retained. Note that the switching always precedes the second Miller circuit 48′ in the path from the difference junction 62 to the first Miller circuit 48, so that the correction voltage is continuously applied. The output voltage at anode 36′ from the second or auxiliary Miller circuit, the rate correction circuit, is inverted before its application to the first Miller circuit grid 42, by an inverting stage 100. Inverting stage 100 includes a vacuum tube 102 having a control grid 104 connected to the junction 106 between two resistors 108 and 110 serially connected between second Miller circuit anode 36' and a suitable negative voltage. The tube 102 has a cathode 112 connected through a cathode resistor 114 to a proper negative voltage. The tube 102 has an anode 116 connected through an anode load resistor 118 to a suitable positive voltage. A potentiometer resistor 120 is connected between anode 116 and a negative voltage. A potentiometer arm 122 taps the voltage on potentiometer resistor 120 leads through a feed-through resistor 124 to the first Miller circuit grid 42. If the proper resistor values are found, fixed resistors may be employed instead of the potentiometer 120 arrangement.

In operation, the difference voltage at junction 62 is the difference between the input and output voltages. As before, the difference voltage is applied at discrete brief intervals to the first Miller circuit grid 42. At this interval the output voltage at first Miller circuit anode 36 reaches a value corresponding to the input voltage at that interval.

The difference voltage at junction 62 is also applied at the interval to change the charge on the control grid 42' of the second Miller circuit 48'. The voltage at the second Miller circuit anode 36' therefore corresponds to the difference voltage at the junction 62, and this difference voltage inverted in polarity, appears at the anode 116 of inverter stage 114 and also at the potentiometer 122. Here, as before, by proper selection of the D. C. (direct current) voltages, any undesired superimposed D. C. voltage is removed. The feed through resistor, with capacitor 40, has a time constant largely determining the rate of change of charge at first Miller circuit grid 42. In other words, as before, there may be a proportionality factor involved where a charge represents a value such as range. In combining voltages by addition or subtraction, due account should be taken of the proportionality factor. Thus for increasing input voltages, the feed-through charge to first Miller circuit 42 is increasingly negative, to cause the output voltage to be increasingly positive. In other words, the integrated input change from the second Miller circuit must be applied to the first Miller circuit grid 42 in the same sense as the charge from the difference circuit is applied to that grid 42.

Instead of using switches 68 and 68' as in Figs. 1 and 4 for the intermittent sampling, mechanical switches and storage capacitors are employed in Fig. 5. In Fig. 5 the monostable multivibrator 88 (other switch actuating means could be employed) causes current to pass through a winding 128 of a relay 130. The relay has three movable contacts 132, 134, and 136, which in the normal position of the relay are closed to contacts 138, 140, and 142 respectively. In the actuated condition of the relay 130, the movable contacts 132, 134, and 136 are closed respectively to normally open contacts 144, 146, and 148, respectively, and the normally closed contacts are opened. A first storage capacitor 150 is connected between first movable contact 132 and ground. The first normally open fixed contact 144 is connected to the first Miller circuit grid. The first normally closed fixed contact 138 is connected to difference junction 62. A second storage capacitor 152 is connected between the other two movable contacts 134 and 136. The second normally open contact 146 is connected to second Miller circuit grid 42'. The second normally closed contact 140 is connected to ground and the third normally open contact 148 is connected to a terminal 154 of a cathode resistor 156. The other terminal of cathode resistor 156 is connected to the second Miller storage circuit cathode 44'. The terminal 154 is connected to a suitable negative voltage. The third normally closed contact 142 is connected to the difference junction 62.

In operation of the arrangement of Fig. 5, the difference voltage at junction 62 is connected for substantial periods compared to the actuated interval of relay 130 to the capacitors 150 and 152. Therefore, capacitors 150 and 152 take on charges proportional to the voltage difference between the junction 62 and ground. In the interval when the relay 130 is actuated, first storage capacitor 150 is connected to grid 42. The charge stored on capacitor 150, proportional to the difference voltage, is integrated by the first Miller circuit to cause the output voltage to assume substantially the value of the input voltage at the actuation interval. A like integration due to a similar charge on second storage capacitor 152 is effective to provide a voltage at second Miller storage circuit anode 36'. This second integrated voltage, proportional to the difference voltage causes a current to flow through resistor 50. The flowing charge thus applied causes the total charge on the grid 42 of the first Miller circuit 48 to gradually change, and so also the output voltage at a rate determined by this last difference voltage. The mechanical switch, relay 130, in this example performs the polarity inversion of the difference voltage applied to the first Miller circuit grid 42 via the second Miller circuit. Thus the difference voltage applied from the junction 62 and that applied after integration in the auxiliary Miller circuit 48' to the grid of the first Miller circuit 48 are applied in the same sense. The relay 130 may be used where the sampling intervals are separated by comparatively long intervals.

The invention has thus been described as means providing an output voltage which accurately and comparatively smoothly tracks an intermittently sampled input.

What is claimed is:

1. The combination comprising first and second signal storage circuits each including an amplifier having a cathode, an anode and a control element, an anode load and a capacitor connected between said anode and said control element, means to derive a difference voltage between an input voltage and said first storage circuit anode voltage, means intermittently to apply said difference voltage for intervals of time to said first and second storage circuit control elements, means comprising a feed-through resistor to permit current to flow from said second storage circuit anode to said first storage circuit control element, and means between said difference voltage deriving means and said first storage circuit control element to apply in the proper sense to be a correction signal the current from said second storage circuit through said feed-through resistor.

2. The combination comprising first and second storage circuits each including an amplifier having a cathode, an anode and a control element, an anode load resistor connected to said anode, and a capacitor connected between said anode and said control element, means to derive a difference signal voltage between the voltages of said first storage circuit anode and an input voltage, a first signal path between said difference voltage means and said first storage circuit control element, a second signal path including said second storage circuit between said difference voltage means and said first storage circuit control element, and inversion means in said second path to cause like polarity of application of charge to said first and second storage circuit control element for increasing difference voltages.

3. The combination claimed in claim 2, said amplifier being a vacuum tube.

4. The combination claimed in claim 2, said means to derive a difference voltage comprising a resistance network.

5. The combination claimed in claim 2, said means for application of like polarity signals comprising an inverter stage.

6. The combination claimed in claim 2, said means for application of like polarity signals comprising an inverter stage connected between said difference voltage deriving means and both said signal paths to invert the signal in said second path with respect to that in said first path.

7. The combination claimed in claim 2, said inversion means comprising an inversion stage in said second path only.

8. The combination claimed in claim 2, said inversion means comprising an inversion stage in said second path connected between said second storage circuit anode and said first storage circuit control element.

9. The combination claimed in claim 2, said inversion means comprising capacitors and contacts, a different capacitor in each said path.

10. The combination claimed in claim 2, said inversion means comprising a pair of capacitors, a different one in each said path, a pair of switch means a different one connected in each said path, said switch means connecting said capacitors to said difference signal voltage deriving means to store signal voltage thereon, and thereafter simultaneously disconnecting said capacitors therefrom and connecting a first of said capacitors to said first storage circuit control element and a second of said capacitors to said second storage circuit with polarity inversion, and repeatedly performing said connecting and disconnecting.

11. The combination claimed in claim 2, further comprising switch means intermittently to connect and disconnect said difference signal voltage to said signal paths.

12. The combination claimed in claim 2, further comprising switch means intermittently to connect and disconnect said signal paths each simultaneously with the other, said connections being made at discrete periods for intervals of time short with respect to the periods between connections.

13. The combination comprising a first signal storage means having an output responsive to a signal input, a second signal storage means having an output responsive to a signal input, means connected to said first signal storage means output to derive a difference signal between said first storage means output and an input signal from a source, means comprising first and second signal paths between said difference signal deriving means and said first storage means input to apply said difference signal thereto, one of said paths including said second storage means, and means to apply said second storage means output to said first storage means input for continuous correction and in a sense to conform said second output to said source signal.

14. The combination claimed in claim 13 further comprising means intermittently and simultaneously to connect and disconnect both said signal paths from said difference signal, the intermittent connection of said paths being for equal time intervals, said connection and disconnection in said second path preceding said second storage circuit.

15. An electrical data storage circuit comprising, in combination, electrical energy storage means; first circuit means connected to said energy storage means for maintaining the energy stored therein at a constant level and for permitting rapid change in the energy stored therein from one constant level to another constant level in response to the instantaneous applications thereto of different magnitude electrical signals; data signal generating means connected to said energy storage means for periodically applying different magnitude electrical energy pulses thereto, whereby the voltage thereacross tends to assume a step waveform; and second circuit means connected to said energy storage means for smoothing the portions of said step waveform between the beginning of each step thereof and the beginning of the following step thereof.

16. An electrical data storage circuit comprising, in combination, electrical energy storage means; first circuit means connected to said energy storage means for maintaining the energy stored therein at a constant level and for permitting instantaneous change in the energy stored therein from one constant level to another constant level in response to the instantaneous applications thereto of different magnitude electrical signals; data signal generating means connected to said energy storage means for periodically applying different magnitude electrical energy pulses thereto, whereby the voltage thereacross tends to assume a step waveform; and second circuit means connected to said energy storage means for smoothing the portions of said step waveform between the beginning of each step thereof and the beginning of the following step thereof without affecting the instantaneous magnitude of said waveform at the beginning of each said step.

17. An electrical data storage circuit as set forth in claim 16, wherein said electrical energy storage means comprises a storage capacitor.

18. An electrical data storage circuit as set forth in claim 16, and further including difference signal voltage deriving means connected to said energy storage means for deriving therefrom a signal proportional to the difference in magnitude between each pulse and the one next adjacent thereto, said second circuit means being connected to said difference signal voltage deriving means for applying said difference signal voltage to said energy storage means so as to smooth the step waveform thereof.

19. An electrical data storage circuit as set forth in claim 18, wherein said energy storage means and said first circuit means comprise together a Miller storage circuit.

20. An electrical data storage circuit as set forth in claim 19, said second circuit means including a second Miller storage circuit connected to receive said difference signal voltage.

References Cited in the file of this patent

UNITED STATES PATENTS

| | | |
|---|---|---|
| 2,584,882 | Johnson | Feb. 5, 1952 |
| 2,594,104 | Washburn | Apr. 22, 1952 |